United States Patent [19]

Artho

[11] Patent Number: 4,991,895
[45] Date of Patent: Feb. 12, 1991

[54] LIVESTOCK SHELTER AND BALED HAY RACK

[76] Inventor: Jerry D. Artho, Box 7, Bushland, Tex. 79012

[21] Appl. No.: 524,532

[22] Filed: May 17, 1990

[51] Int. Cl.$^5$ .............................................. B60P 3/00
[52] U.S. Cl. ........................................ 296/6; 119/16; 280/43.14
[58] Field of Search ................ 296/6, 3, 8, 9; 119/16, 119/20, 27, 58, 59, 60; 280/43.14

[56] References Cited

U.S. PATENT DOCUMENTS

| | | | |
|---|---|---|---|
| 1,873,469 | 8/1932 | Pearce | 296/6 |
| 3,416,496 | 12/1968 | Peterson | 119/16 |
| 3,502,366 | 3/1970 | Poleschook | 296/8 |
| 3,885,524 | 5/1975 | Gregory | 119/16 |
| 4,706,609 | 11/1987 | Delichte | 119/60 |

Primary Examiner—Robert R. Song
Attorney, Agent, or Firm—Robert K. Rhea

[57] ABSTRACT

A generally rectangular elongated horizontally disposed open frame having a base frame, upright studs, joists and rafter members form an overhead round hay bale rack for supporting hay bales. One side of the frame is closed by panel members to form a windbreak for livestock which may enter both ends or the side opposite the windbreak panels for shelter. Hay bales supported by the hay rack portion of the device may be rolled off the rack for access by animals as they consume the respective bale.

6 Claims, 3 Drawing Sheets

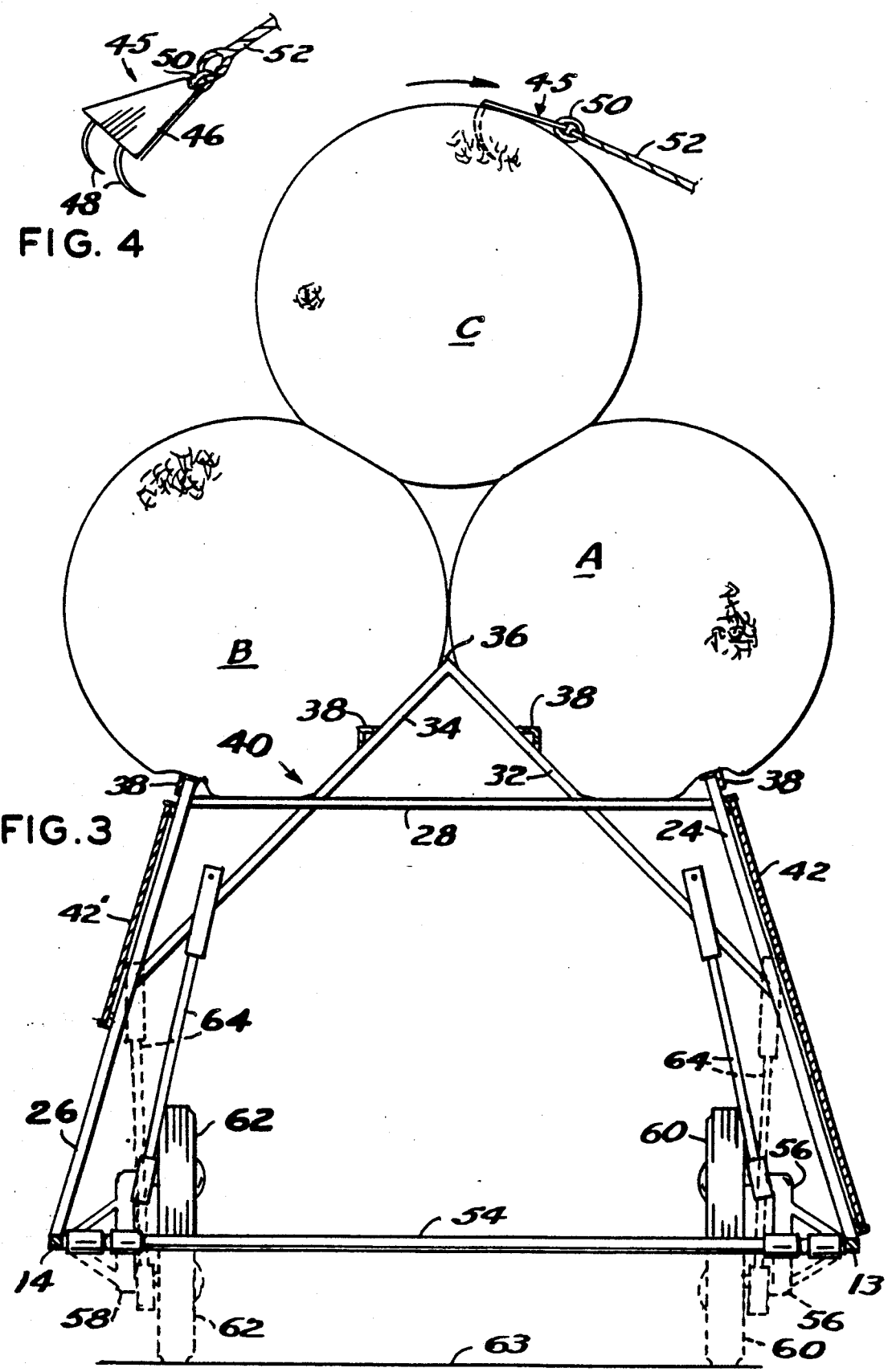

LIVESTOCK SHELTER AND BALED HAY RACK

This invention relates to agricultural equipment and more particularly to a movable livestock shelter and windbreak having facilities for storing a plurality of jumbo size roll baled hay.

BACKGROUND OF THE INVENTION

1. Field of the invention

It is well understood by stockmen or ranchers raising cattle in open flat country where there is very little natural windbreaks for cattle, that is it desirable to provide some type of windbreak. In such open country, where there are no windbreaks for livestock and the ground is frozen or covered with snow and the wind chill index is in the minus readings extra feed needs to be provided for livestock for survival Further, the requirement of extra feed is greatly reduced where a windbreak is provided, either natural or man-made. In consideration of the soil or pasture, particularly if it is hay-raising soil, it is desirable to move the feeding station from time to time to prevent undue damage to the dormant hay producing vegetation. Therefore it is desirable that a hay feeder and shelter be provided which may be moved by a pick-up truck, or the like, from one location to another. This invention provides such a feeder-shelter.

2. Description of the Prior art

Range cattle feeders are well known and have generally comprised a mobile vehicle which contains a quantity of hay either loose or baled with slats or grating surrounding the hay permitting animal access to the hay. Such a unit may contain several relatively small bales of hay which provides some windbreak for the animals until the hay has been consumed.

Other patents such as U.S. Pat. No. 4,706,609 discloses a multiple ring concentric open frame device which contains, in the innermost central ring a jumbo size bale of hay with the outer ring framework providing a space through which the animals extend their head and neck for eating hay from the bale. This prevents waste of hay by the excess hay falling from the animal's mouth into the area between the rings of the frame where it may be reached by the animals and not be trampled under foot.

The most pertinent patent is believed to be U.S. Pat. No. 3,885,524 which discloses a partially enclosed feeder and shelter having a hay loft under an overlying roof with grating at one end of the hay rack permitting feed to be obtained by an animal when within the shelter. This device is primarily intended for hay baled in relatively small, rectangular bales which are manually placed in the hay loft under the roof.

This invention is distinctive over this and other similar feeder shelter patents by providing a rectangular open framework shelter having one side closed to provide a windbreak and an overhead frame rack area for storing a plurality of superposed jumbo size hay bales to be individually fed to the livestock by successively rolling the hay bales off the overhead rack as the respective bale is consumed.

SUMMARY OF THE INVENTION

Interconnected side and end rails form an elongated rectangular open base frame. Opposing pairs of longitudinal and laterally spaced generally upright studs are connected adjacent their upper end portions with respective ends of joists and connected at their depending ends with the respective base frame side rail. Rafter members connected at their depending Q ends with the respective pair of studs, intermediate the height of the latter, project upwardly in converging relation and are joined forming a central apex spaced above the joists, medially the frame width. An angle iron frame brace member coextensive with the length of the base frame, is connected with the upper end of the respective stud longitudinally of the frame and with each rafter above the joists and downwardly with respect to the apex to form a rigid framework having an overhead hay bale supporting rack. A plurality of panels extend coextensively with the framework length and height at one side thereof. Other similar panels longitudinally overlap the uppermost portion of the studs at the opposite side of the frame.

One end of the frame is provided with an A-frame type trailer hitch. Intermediate its ends the base frame is provided with a pair of vertically retractable wheels for transporting the device when desired.

The principal object of this invention is to provide a movable livestock windbreak and jumbo size hay bale rack for sheltering and feeding cattle in open country in inclement weather.

BRIEF DESCRIPTION OF THE DRAWINGS

FIG. 3 is a vertical cross section view partially in elevation, to a larger scale, taken substantially along the line 3—3 of FIG. 2 and illustrating a plurality of jumbo size hay bales supported by the rack; and, FIG. 4 is a perspective view of a hay bale hook.

DESCRIPTION OF THE PREFERRED EMBODIMENTS

Figure 1:
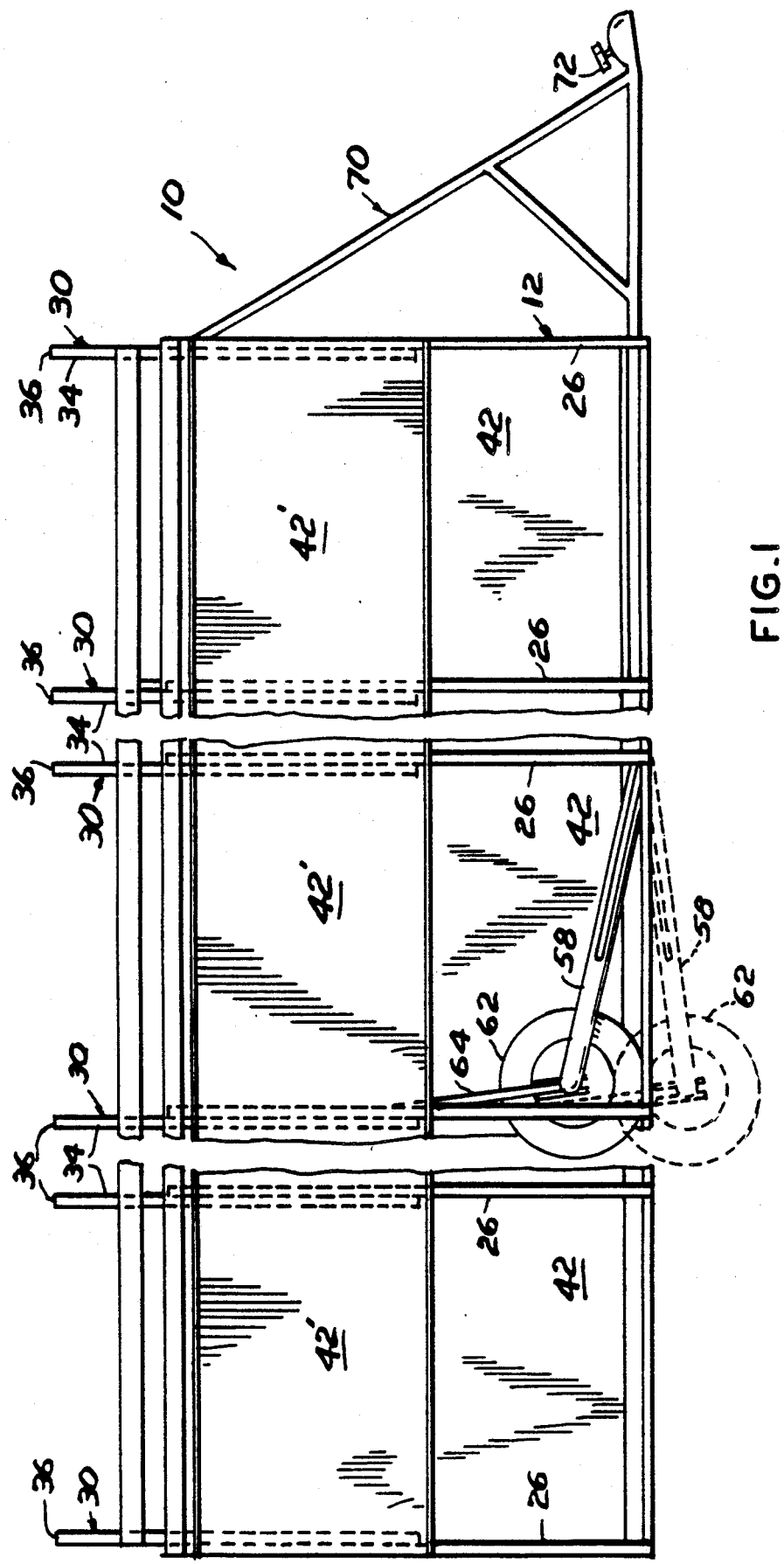
FIG. 1 is a fragmentary side elevation view of the open framework illustrating by dotted lines the position of the frame supporting wheels when lowered to a transport position.
Figure 2:
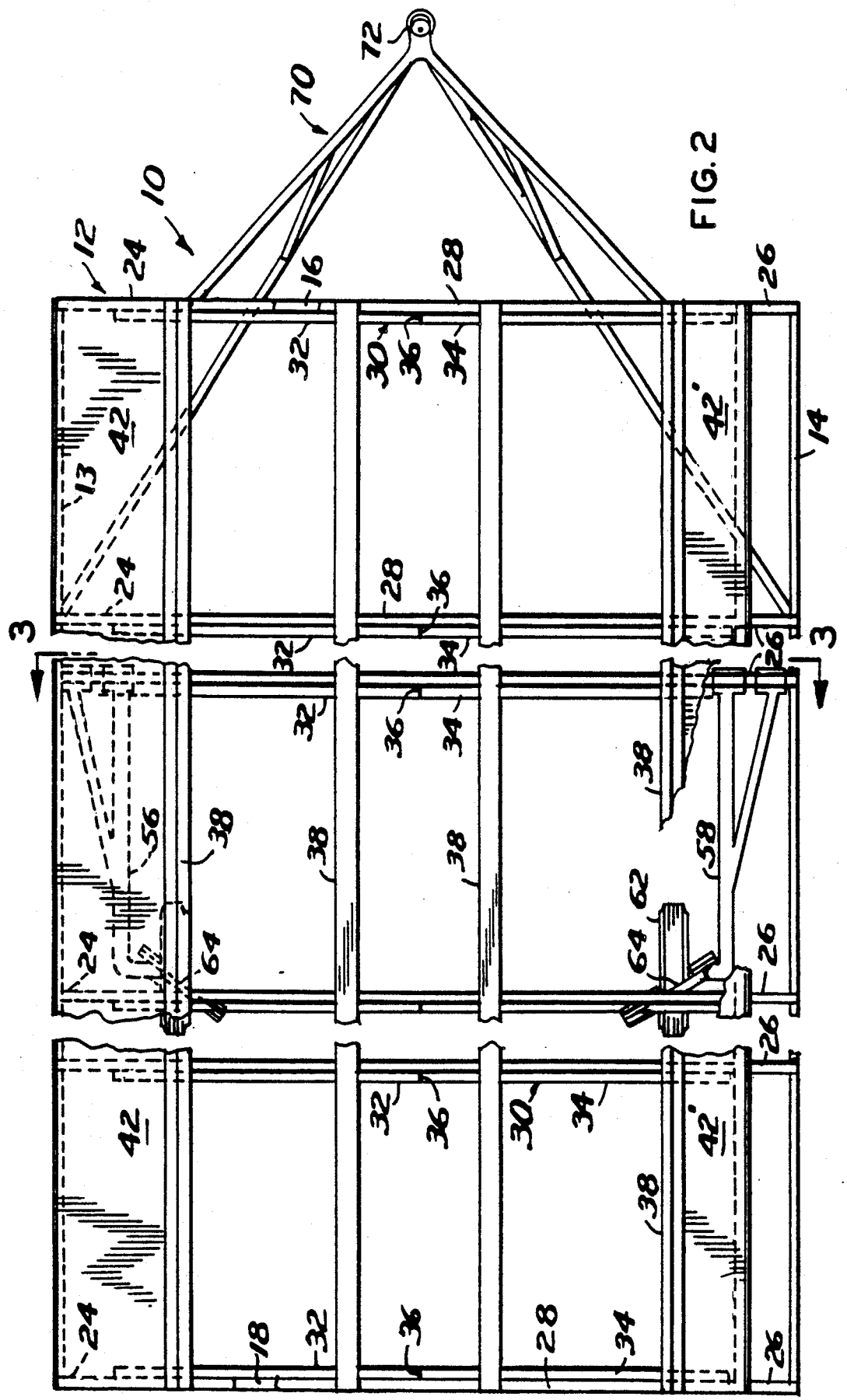
FIG. 2 is a fragmentary top view of FIG. 1.

Like characters of reference designate like parts in those figures of the drawings in which they occur.

In the drawings:

The reference numeral 10 indicates the device as a whole comprising an open box-like frame 12 elongated rectangular in general configuration. By way of the example the device 10 is approximately 12 feet (3.65 M) wide, 8 feet (2.43 M) high and 40 feet (12.19 M) long and formed by side members 13 and 14 interconnected in laterally spaced relation at their respective ends by end members 16 and 18 forming a rectangular horizontal base frame means 20 having an open central portion accessible from one side and both ends of the frame, as presently explained. The device 10 is generally truncated triangular shaped when viewed from one end (FIG. 3).

A plurality of pairs of generally upright longitudinally spaced wall studs 24 and 26, are respectively rigidly connected in laterally spaced relation at their depending ends with the base frame side members 13 and 14 and adjacent their upper ends by respective ends of a ceiling joist 28.

A like plurality of rafter means 30 formed by pairs of rafters 32 and 34, interconnected at their upper ends to form an apex 36, are connected at their respective diverging end portions with the respective studs 24 and 26 intermediate the height of the latter so that the apex 36 of the rafters project a predetermined distance above the horizontal plane defined by the joists 28 medially the framework width.

A plurality of right angle frame reinforcing rails 38 extend longitudinally coextensive with the framework and are rigidly connected with the top ends of the respective studs 24 and 26 and the respective rafters 32 and 34 intermediate their height between the joists 28 and apex 36. The rails 38, joists 28 and rafters 32 and 34 form a rigid baled hay platform or rack 40 at the upper limit of the device 10.

A plurality of preferably sheet iron panels 42, overlie, in edge overlapping relation with respect to each other, the studs 24 at one side of the framework to form a windbreak wall when disposed normal to the wind direction. Similar panels 42' overlie the upper end portion of the studs 26 at the opposite side of the frame to further insure a rigid bracing for the device and add additional shelter for livestock within the frame.

Operation

The device 10 is normally disposed horizontally on substantially level soil as shown by FIGS. 1 and 3 and in this position a front-end loader, not shown, may successively hoist IQ a plurality of hay bales A, B, and C on the hay rack means 40. By positioning the bails A and B on opposing sides of the row of rafters (FIG. 3) the third bale C may be lifted to overlie the two bales A and B. The center of gravity of each of the bales A and B being inwardly of the upper limit of the respective stud 24 and 26 maintain the bales in place as shown and forms a temporary hay roof. Since the bales are usually not longer than their diameter a plurality of piles of three each (A, B and C) of the bales may be disposed in longitudinal end-to-end relation along the rack 40.

When it is desired to feed livestock being sheltered by the device 10, an upper most hay bale is pulled off the rack means 40 so that it falls by gravity to the surface of the earth adjacent one side of the framework 10. This is accomplished by a bale hook 45 (FIG. 4) comprising a triangular generally planar body 46 having a pair of arcuate hooks 48 depending from its base end and an endless ring 50 secured to its apex. With one end portion of a rope 52 connected with the ring 50 the bale hook may be manually thrown up and over the topmost surface of one of the uppermost bales. With the hooks 48 engaged with the hay of a bale and the other end portion of the rope tied to a prime mover, or to the saddle horn of a saddle on a riding horse, neither being shown, the hay bale may be pulled off the hay rack in a rolling action of the bale in a manner well understood by ranchers or farmers The device 10 is rendered mobile by a tubular shaft 54 which extends transversely of the base frame side members 13 and 14 substantially medially their ends which journals a pair of crank arms 56 and 58 for vertical pivoting movement Each crank arm has an axle portion journalling a pair of wheels 60 and 62, respectively, within respective sides of the base frame. When the device is to be moved it is assumed no hay bales are on the rack means 40, the base frame sides are lifted, as by a conventional jack, not shown, allowing the wheels 60 and 62 to remain in contact with the surface of the earth 63. An upright strut 64 pivotally connected at one end portion with the respective axle is removably bolted at its other end portion with an adjacent stud and supports the framework for mobile movement. When the framework is parked and rests on the surface of the earth, the bolt end of the struts 64 is loosely supported by adjacent rafters A generally conventional trailer hitch 70, A-frame in shape, and connected with one end portion of the framework 10 is connected by its ball hitch 72 with the trailer hitch ball of a pick-up truck or the like, not shown, for moving the device 10 to a new location.

Obviously the invention is susceptible to changes or alterations without defeating its practicability. Therefore, I do not wish to be confined to the preferred embodiment shown in the drawings and described herein.

I claim:

1. A combination livestock shelter and baled hay rack, comprising:

a horizontal base frame having elongated side members interconnected at their respective ends by end members;

a plurality of opposing pairs of longitudinally spaced generally upright studs on said base frame side members;

a like plurality of joist means extending transversely of said base frame and connected with the upper end portion of the respective pairs of studs for forming a baled hay support rack;

first rail means coextensive with said base frame side members overlying and connected with the upper end limit of said studs for forming a lateral limit for baled hay placed on said rack;

rafter means including pairs of rafters respectively connected at their depending end portions with an intermediate portion of each stud of said pairs of studs and a lateral end portion of each respective said joist and projecting a predetermined distance above said joists for longitudinally dividing said bale rack; and, panel means extending between said studs above one said base side member for forming a windbreak.

2. The combination according to claim 1 and further including:

other rail means coextensive with the base frame side members overlying and secured to an intermediate portion of the respective rafters of said rafter means extending above said joists for maintaining pairs of juxtaposed bales of hay at respective lateral limits of the baled hay rack when placed thereon.

3. The combination according to claim 2 and further including:

retractable wheel means including bell crank axles pivotally connected with said base frame for supporting the latter in a mobile manner; and, trailer hitch means connected with one end of said base frame for connection with a prime mover.

4. The combination according to claim 3 in which the wheel means further includes:

a strut extending between and pivotally connected at its respective end portions with the respective said bell crank axle and an adjacent said stud in base frame supporting relation.

5. The combination according to claim 3 and further including:

hay hook means including an elongated strand for sequentially pulling baled hay off said rack.

6. The combination according to claim 4 and further including:

hay hook means including an elongated planar body having a pair of elongated arcuate hooks cooperatively projecting from one end of the body laterally of its plane and having an endless ring rigidly connected to its other end; and, an elongated strand connected at one end with said ring.

* * * * *